US011326667B2

(12) United States Patent
Howard

(10) Patent No.: US 11,326,667 B2
(45) Date of Patent: May 10, 2022

(54) LOCKABLE SHACKLE APPARATUS AND METHOD OF USE

(71) Applicant: FUSION TOOLS, INC., Gallatin, TN (US)

(72) Inventor: West Howard, Gallatin, TN (US)

(73) Assignee: Fusion Tools, Inc., Gallatin, TN (US)

( * ) Notice: Subject to any disclaimer, the term of this patent is extended or adjusted under 35 U.S.C. 154(b) by 385 days.

(21) Appl. No.: 16/740,113

(22) Filed: Jan. 10, 2020

(65) Prior Publication Data

US 2021/0215230 A1 Jul. 15, 2021

(51) Int. Cl.
*F16G 11/14* (2006.01)
*B60D 1/18* (2006.01)

(52) U.S. Cl.
CPC .............. *F16G 11/146* (2013.01); *B60D 1/18* (2013.01)

(58) Field of Classification Search
CPC ...... F16G 11/146; F16G 11/05; F16G 11/101; F16G 11/14; B60D 1/18; B60D 1/565
See application file for complete search history.

(56) References Cited

U.S. PATENT DOCUMENTS

| | | | |
|---|---|---|---|
| 4,546,627 A | 10/1985 | Shrawder et al. | |
| 6,202,443 B1 | 3/2001 | Grosser-Samuels | |
| 6,484,535 B2 | 11/2002 | Grosser-Samuels | |
| 6,571,854 B1* | 6/2003 | Palmer | E06B 9/324 24/129 R |
| 6,684,805 B2 | 2/2004 | Curchod | |
| D657,234 S | 4/2012 | Herman | |
| 9,981,779 B2 | 5/2018 | Tanimoto | |
| 10,434,829 B2 | 10/2019 | Russell et al. | |
| 2001/0010160 A1 | 8/2001 | Grosser-Samuels | |
| 2004/0194259 A1 | 10/2004 | Tylaska et al. | |
| 2012/0005865 A1* | 1/2012 | Boden | F16G 11/101 24/136 R |

(Continued)

FOREIGN PATENT DOCUMENTS

| | | |
|---|---|---|
| CN | 103299011 A | 9/2013 |
| JP | 2004-520894 A | 7/2004 |
| JP | 2015-044615 A | 3/2015 |

OTHER PUBLICATIONS

International Search Report and Written Opinion for PCT/US2021/012709, dated Apr. 22, 2021, 10 pages.

*Primary Examiner* — David M Upchurch
(74) *Attorney, Agent, or Firm* — Patterson Intellectual Property Law, P.C.; Alex H. Huffstutter

(57) ABSTRACT

A lockable shackle apparatus, and method of use, is provided herein. The lockable shackle apparatus may comprise a stopper body, a rope, and a flexible lock. First and second passageways extend through the stopper body transverse to a length of the stopper body. The rope is positioned through the first and second passageways with a majority of the rope extending from a first pair of adjacent ends of the first and second passageways. The flexible lock includes a main hole configured to receive the majority of the rope and be positioned adjacent to the stopper body. A distal portion of the majority of the rope is configured to be removably positioned over the stopper block. The flexible lock further includes first and second lock holes configured to be positioned over first and second ends of the stopper body for retaining the distal portion of the rope on the stopper body.

20 Claims, 19 Drawing Sheets

(56) References Cited

U.S. PATENT DOCUMENTS

| | | | |
|---|---|---|---|
| 2015/0096151 A1* | 4/2015 | Corio | B64F 1/12 24/115 R |
| 2016/0264305 A1 | 9/2016 | Tanimoto | |
| 2017/0334533 A1 | 11/2017 | Herman | |

* cited by examiner

LOCKABLE SHACKLE APPARATUS AND METHOD OF USE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

1. Field of the Invention

The present invention relates generally to soft shackles. More particularly, the present invention pertains to lockable soft shackles and methods of use thereof.

2. Description of the Prior Art

Metal shackles have long been utilized in the construction industry and the automotive industry, particularly with regard to off-road applications, marine applications, and the like. Metal shackles are typically used to attach chains, cables, or ropes to a vehicle for pulling or to hoists or cranes for lifting. One such traditional metal shackle features a metal U-shaped loop which is closed by a bolt or pin. Metal shackles, while strong, have several drawbacks such as their weight and difficulty of use. Because they are made from metal, they can be very heavy. Additionally, the bolt or pin can sometimes get stuck which can make installing and removing the shackle exceedingly difficult. Finally, the bolt or pin is fully detachable and can frequently get lost.

Recently, shackles made from rope have become a popular alternative to metal shackles and are generally referred to as "rope shackles." A rope shackle generally comprises a length of rope with a tight knot at one end and an eyelet formed at the other end. The length of rope can be threaded through an attachment point on a vehicle and the knot positioned through the eyelet to form a loop. Other towing or attachment devices can then be attached to the looped rope shackle. Rope shackles are typically much lighter than metal shackles which makes them easier to use and more convenient to store when not in use. Additionally, rope shackles made from modern high strength fibers are as strong if not stronger than metal shackles. Rope shackles also do not rust like metal shackles.

One issue associated with rope shackles is that they cannot be locked shut like metal shackles. Accordingly, rope shackles could easily fail if the knot were to slip back through the eyelet during use. Additionally, the fashioned knot can be quite large in order to mitigate this issue which causes the entire rope shackle to become rather bulky. The fact that the metal shackle is lockable is one reason why some users still prefer it over the newer rope shackles, namely because they are confident that it will not fail. In some applications, a lockable shackle is required, especially in lifting applications. Additionally, the strength of rope shackles is dependent on the fashioned knot. The strength of a rope shackle thus depends on how well the fabricator makes the knot. Thus, the strength of said rope shackles can be inherently inconsistent. Additionally, over time, rope shackles with knots can lose strength, slip, and fail.

BRIEF SUMMARY

Accordingly, a need exists for a new rope shackle that is lockable and can be easily manufactured with consistent strength. The new rope shackle may also eliminate the need for the knot at one end. Provided herein is a lockable shackle apparatus which includes a stopper body, a rope positioned through passageways of the stopper body, and a flexible lock positioned over the rope such that an eyelet of the rope can be positioned over the stopper body and the flexible lock may lock the eyelet in place by being removably coupled to the stopper body. Because the flexible lock receives the rope therethrough, the flexible lock is always available when you need it.

All existing rope shackles are not rated for lifting applications. All shackles that are to be used and rated for lifting must have a lock to ensure the shackle stays closed. By having a locking mechanism (e.g., the flexible lock), the disclosed lockable shackle apparatus (e.g., new rope shackle) can be rated for lifting uses. The locking mechanism provides the confidence customers need in securing loads for transportation, pulling, lifting, and similar applications.

A combination of the stopper body and splicing or sewing ends of the rope together eliminates the need for a knot. Because the rope is passed through passageways of the stopper block and spliced together, the lockable shackle apparatus can be manufactured with a consistent strength every time. Using a splice in the rope to hold the lockable shackle apparatus together is faster to manufacture than forming a complicated knot. This may reduce the labor costs associated with manufacturing the lockable shackle apparatus.

The flexible lock is inexpensive and easily replaceable. Accordingly, a customer only needs to buy a replacement flexible lock if the existing one becomes dry rotted, worn out, or broken.

In certain embodiments, the lockable shackle apparatus can be integrated into a winch line or the like that can have a synthetic shackle integrated into its construction.

According to one aspect of the present disclosure, there is provided a lockable shackle apparatus comprising a stopper body, a rope, and a flexible lock. The stopper body includes a length defined between a first end and a second end, a first passageway extending through the stopper body transverse to the length, and a second passageway extending through the stopper body transverse to the length. The first passageway is positioned closer to the first end than to the second end and the second passageway is positioned closer to the second end than to the first end. The rope is positioned through the first and second passageways such that a majority of the rope extends between a first pair of adjacent ends of the first and second passageways. The flexible lock includes a main hole, a first lock hole, and a second lock hole. The main hole is configured to receive the majority of the rope therethrough and further configured to be positioned adjacent to the stopper body. The first lock hole is configured to be positioned over the first end of the stopper body and the second lock hole is configured to be positioned over the second end of the stopper body.

According to another aspect of the lockable shackle apparatus, a distal portion of the majority of the rope opposite the stopper body may be configured to be positioned over the first and second ends of the stopper body between the flexible lock and the stopper body.

According to another aspect of the lockable shackle apparatus, the first and second passageways may include a second pair of adjacent ends. In accordance with this aspect, a minority of the rope may pass closely between the second pair of adjacent ends.

According to another aspect of the lockable shackle apparatus, each end of the second pair of adjacent ends of the first and second passageways may include at least a tapered portion. In accordance with this aspect, the minority of the rope passes over the tapered portion of each end of the second pair of adjacent ends.

According to another aspect of the lockable shackle apparatus, the first and second passageways may be parallel.

According to another aspect of the lockable shackle apparatus, the stopper body may include a first groove defined between the first passageway and the first end, and a second groove defined between the second passageway and the second end. In accordance with this aspect, the first groove may be configured to receive a rim of the first lock hole of the flexible lock and the second groove may be configured to receive a rim of the second lock hole of the flexible lock.

According to another aspect of the lockable shackle apparatus, the first and second grooves may be defined circumferentially relative to the length of the stopper body.

According to another aspect of the lockable shackle apparatus, the stopper body may be cylindrical between the first and second ends.

According to another aspect of the lockable shackle apparatus, the rope may be a continuous loop.

According to another aspect of the lockable shackle apparatus, the rope may include a spliced portion configured to define the continuous loop. In accordance with this aspect, the spliced portion may be configured to be positioned within the first and second passageways of the stopper body.

According to another aspect of the lockable shackle apparatus, each of the main hole, the first lock hole, and the second lock hole may be separated by a common distance.

According to another aspect of the lockable shackle apparatus, the flexible lock may be generally triangular having three corners with one of the main hole, the first lock hole, or the second lock hole positioned proximate to each corner.

According to another aspect of the lockable shackle apparatus, the flexible lock may include a plurality of tabs, each tab associated with one of the main hole, the first lock hole, or the second lock hole and being configured to extend away from a remaining two of the main hole, the first lock hole, or the second lock hole. In accordance with this aspect, each tab may be configured to aid in positioning each of the main hole, the first lock hole, or the second lock hole over the majority of the rope, the first end of the stopper body, or the second end of the stopper body, respectively.

According to further aspects of the present disclosure, there is provided lockable shackle apparatus comprising a cylindrical stopper body, a rope, and a flexible lock. The cylindrical stopper body includes a first end, a second end, a first passageway defined through the stopper body, and a second passageway defined through the stopper body. Each of the first and second passageways includes a respective axis laying in a common plane that bisects the cylindrical stopper body. The first passageway is positioned closer to the first end than to the second end and the second passageway is positioned closer to the second end than to the first end. The rope is positioned through the first and second passageways such that a majority of the rope extends from a first pair of adjacent ends of the first and second passageways. The flexible lock includes a first lock hole, a second lock hole, and a third lock hole. One of the first, second, or third lock holes is configured to receive the majority of the rope therethrough and to be positioned adjacent to the stopper body. A different one of the first, second, or third lock holes is configured to be positioned over the first end of the stopper body, and a remaining one of the first, second, or third lock holes is configured to be positioned over the second end of the stopper body.

According to another aspect of the lockable shackle apparatus, the cylindrical stopper body may include a first groove positioned between the first end and the first passageway, and a second groove positioned between the second end and the second passageway. In accordance with this aspect, at least a portion of a rim of one of the first, second, or third lock holes is configured to be received by the first groove. Further, in accordance with this aspect, at least a portion of a rim of a different one of the first, second, or third lock holes is configured to be received by the second groove.

According to still further aspects of the present disclosure, there is provided a method of using a lockable shackle apparatus. The method includes (Step A) providing a stopper block with a rope loop extending therefrom and a locking mechanism received on the rope loop such that the locking mechanism is positioned proximate to the stopper block with a majority of the rope loop extending through the locking mechanism away from the stopper block. The method further includes (Step B) looping a distal portion of the rope loop over the stopper block between the stopper block and the locking mechanism. The method further includes (Step C) positioning first and second free ends of the locking mechanism over respective first and second ends of the stopper block to lock the distal portion of the rope loop around the stopper block.

According to another aspect of the method of using the lockable shackle apparatus, Step C may further comprise positioning a first locking hole of the locking mechanism over the first end of the stopper block and positioning a second locking hole of the locking mechanism over the second end of the stopper block.

According to another aspect of the method of using the lockable shackle apparatus, the method may further comprise prior to Step B positioning the distal portion of the rope loop through a proximal portion of the rope loop defined between the locking mechanism and the stopper block.

According to another aspect of the method of using the lockable shackle apparatus, the method may further comprise (Step D) removing the first and second free ends of the locking mechanism from the first and second ends of the stopper block and (Step E) removing the distal portion of the rope loop from the stopper block.

According to another aspect of the method of using the lockable shackle apparatus, Step A may further comprise positioning the rope loop through any one of three holes of the locking mechanism.

DETAILED DESCRIPTION

Figure 1:
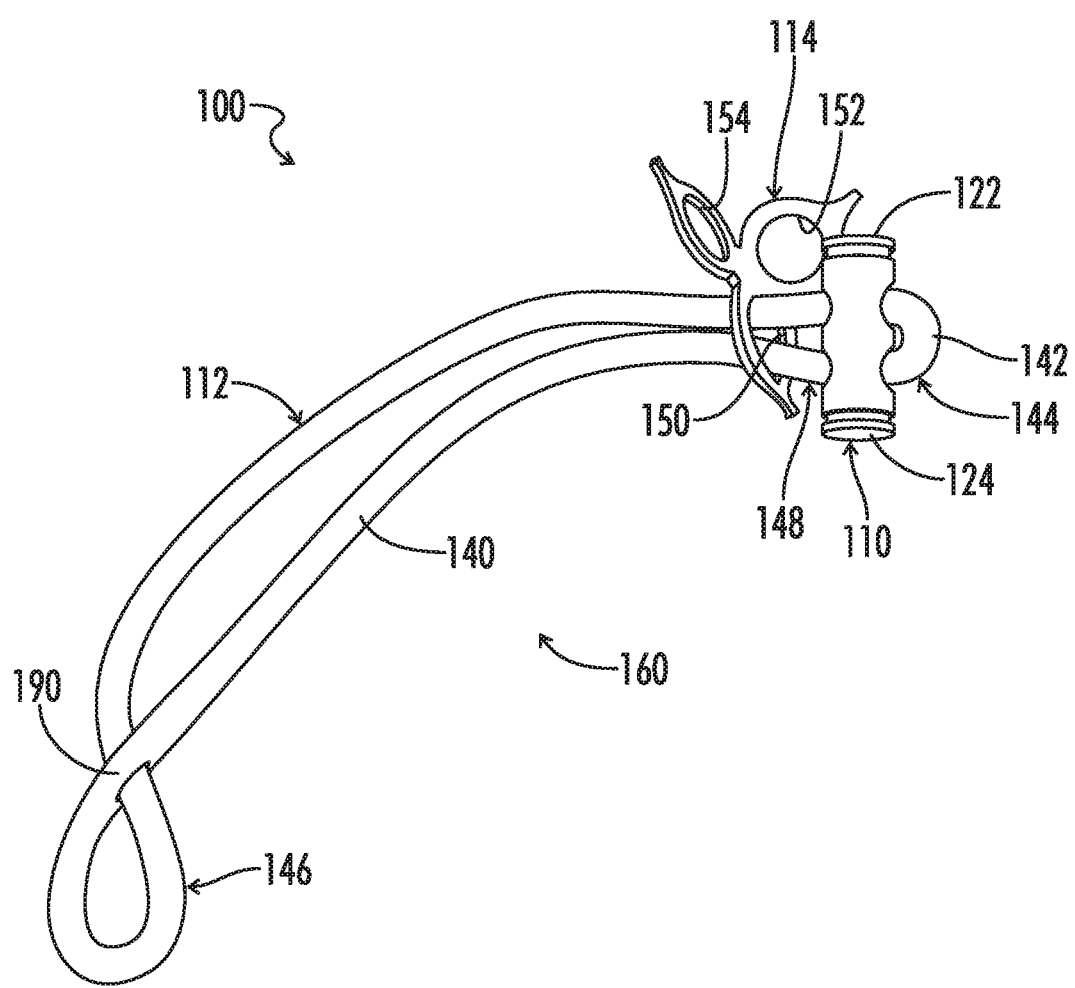
FIG. 1 is a perspective view of a lockable shackle apparatus in an open configuration having a first embodiment of a rope loop extending from a stopper body and a flexible lock extending from the rope loop proximate the stopper body in accordance with the present disclosure.

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Referring to FIGS. 1-3 and 14A-14D, a lockable shackle apparatus is shown. The lockable shackle apparatus 100 includes a stopper body 110, a rope 112, and a flexible lock 114. The lockable shackle apparatus 100 may be used for coupling items together by looping the rope 112 through the two items and then connecting the rope back to the stopper body 110. This may be useful for coupling the lockable shackle apparatus 100 between a vehicle and another item such as a chain or strap. Similarly, it may be useful for lifting lift an item by coupling it between an anchor point of the item and a lifting winch or the like.

The stopper body 110 may be made from aluminum which has been anodized. Alternatively, the stopper body 110 may be made from titanium, bronze, plated or powder-coated steel, or the like. The cost for the anodized aluminum version is cheaper than the alternatives and likely has a longer useful life because plating or powder coatings would eventually fail. The rope 112 may be made from a synthetic material, such as High Modulus Polyethylene (HMPE), Ultra High Molecular weight Polyethylene (e.g., Dyneema or Spectra rope), or the like. Alternatively, the rope 112 may be made from an organic or hybridized material such as, for example, utilizing hemp fibers, cotton, or the like. Additionally, the rope 112 could also be made from stainless steel, galvanized steel, or some other metal rope or cabling. The flexible lock 114 may be made from a rubberized material such as Ethylene Propylene Diene Monomer (EPDM) rubber, a stretchable polymer plastic material, or the like. The flexible lock 114 may be cut from a sheet of said material. Fashioning the flexible lock 114 from a rubberized material and the stopper body 110 from anodized aluminum keeps the lockable shackle apparatus 100 lightweight while also making the flexible lock 114 easy to engage and remove from the stopper body 110.

Figure 4:
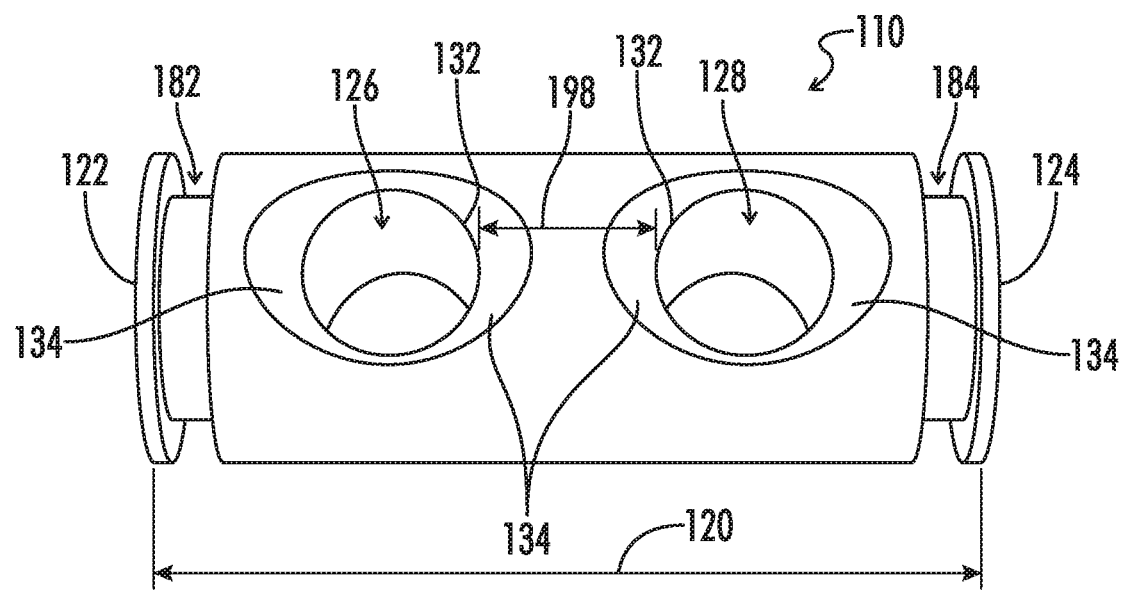
FIG. 4 is a front top perspective view of the stopper body of FIG. 1.
Figure 5:
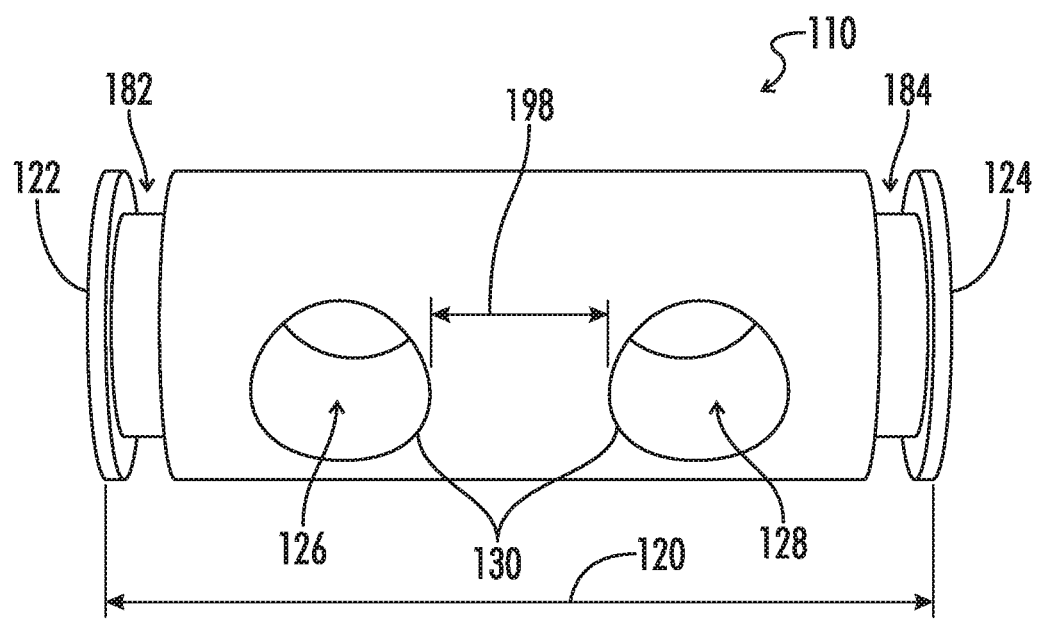
FIG. 5 is a front bottom perspective view of the stopper body of FIG. 4.
Figure 6:
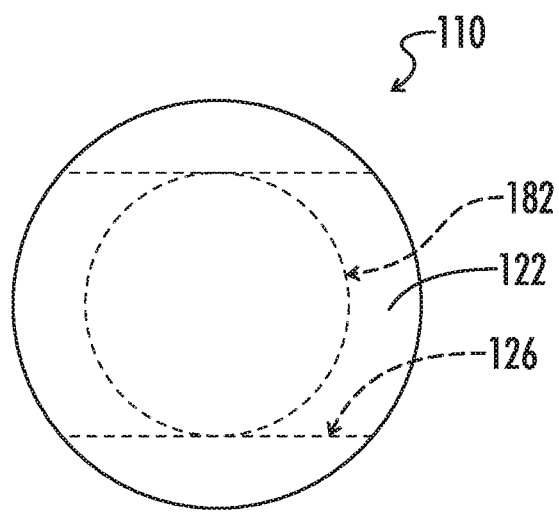
FIG. 6 is left side elevation view of the stopper body of FIG. 4.

As can best be seen in FIGS. 4 and 5, the stopper body 110 is shown in greater detail. The stopper body 110 may also be referred to herein as a stopper block 110. The stopper body 110 may include a length 120 defined between a first end 122 and a second end 124. The stopper body 110 may further include a first passageway 126 and a second passageway 128. Each of the first and second passageways 126, 128 extend through the stopper body 110 transverse the length 120 of the stopper body 110. The first passageway 126 may be positioned closer to the first end 122 than to the second end 124. The second passageway 128 may be positioned closer to the second end 124 than to the first end 122. The first and second passageways 126, 128 may be configured receive the rope 112.

The first and second passageways 126, 128 may be configured to define a first pair of adjacent ends 130 and a second pair of adjacent ends 132. The first pair of adjacent ends 130 may also be referred to herein as a first pair of adjacent openings 130. The second pair of adjacent ends 132 may also be referred to herein as a second pair of adjacent openings 132.

The rope 112 is coupled to the stopper body 110. The rope 112 may be positioned through the first and second passageways 126, 128 such that a majority 140 of the rope 112 extends between the first pair of adjacent ends 130 of the first and second passageways 126, 128. The rope 112, once positioned through the first and second passageways 126, 128, may be spliced together (e.g., a spliced portion 144 of the rope 112) to form a continuous loop, such that no bulky knots are present or needed. A minority 142 of the rope 112 passes closely between the second pair of adjacent ends 132 of the first and second passageways 126, 128. The minority 142 of the rope 112 may include at least a portion of the spliced portion 144 of the rope 112.

Figure 18:
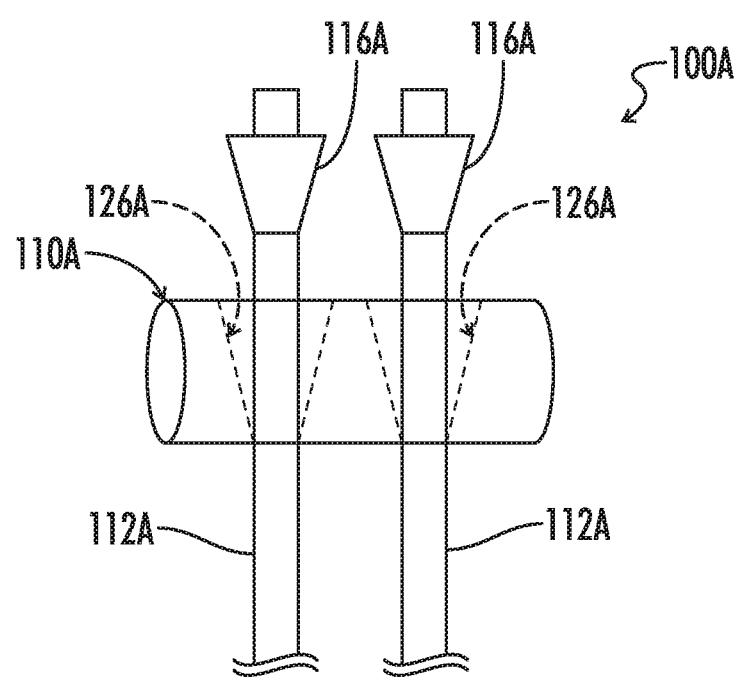
FIG. 18 is a perspective view of an embodiment of a lockable shackle apparatus utilizing metal cabling with end crimps and a stopper body with tapered passageways for receiving the end crimps of the metal cabling in accordance with the present disclosure.

As can best be seen in FIG. 18, an alternate embodiment of a lockable shackle apparatus 100A is shown. The lockable shackle apparatus 100A includes metal cabling 112A instead of the rope 112. The lockable shackle apparatus 100A further includes a stopper body 110A with first and second tapered passageways 126A, 128A which are tapered along their length to allow for crimps 116A which are positioned and attached at ends of the metal cabling 112A to rest in the first and second tapered passageways 126A, 128A. The more pressure applied to the metal cabling 112A, the tighter the crimps would be in the first and second tapered passageways 126A, 128A. Although not illustrated, the lockable shackle apparatus includes the flexible lock 114, substantially unchanged from the lockable shackle apparatus 100 embodiment.

The spliced portion 144 of the rope 112 may be positioned through the first and second passageways 126, 128. By positioning the spliced portion 144 of the rope 112 through the first and second passageways 126, 128, the strength of the splice in the rope 112 may be increased. Additionally, the strength of all synthetic rope shackles is dependent on the two legs of the majority 140 of the rope 112 being evenly loaded. If the two legs do not have the appropriate lengths, the overall strength of the shackle will be weakened. Accordingly, the first and second passageways 126, 128 of the stopper body 110 have enough clearance to allow the rope 112 (e.g., the spliced portion 144 of the rope 112) to slide, at least a little, within the passageways in order to allow the tension of the two legs of the majority 140 of the rope 112 be to be normalized, thus providing maximum strength of the lockable shackle apparatus 100.

The flexible lock 114 may include a main hole 150, a first lock hole 152 and a second lock hole 154. The flexible lock 114 may also be referred to herein as a locking mechanism 114. The main hole 150 may be configured to receive the majority 140 of the rope 112 therethrough and may be positioned adjacent to the stopper body 110. The first lock hole 152 may be configured to be positioned over the first end 122 of the stopper body 110. Likewise, the second lock hole 154 may be configured to be positioned over the second end 124 of the stopper body 110.

Figure 2:
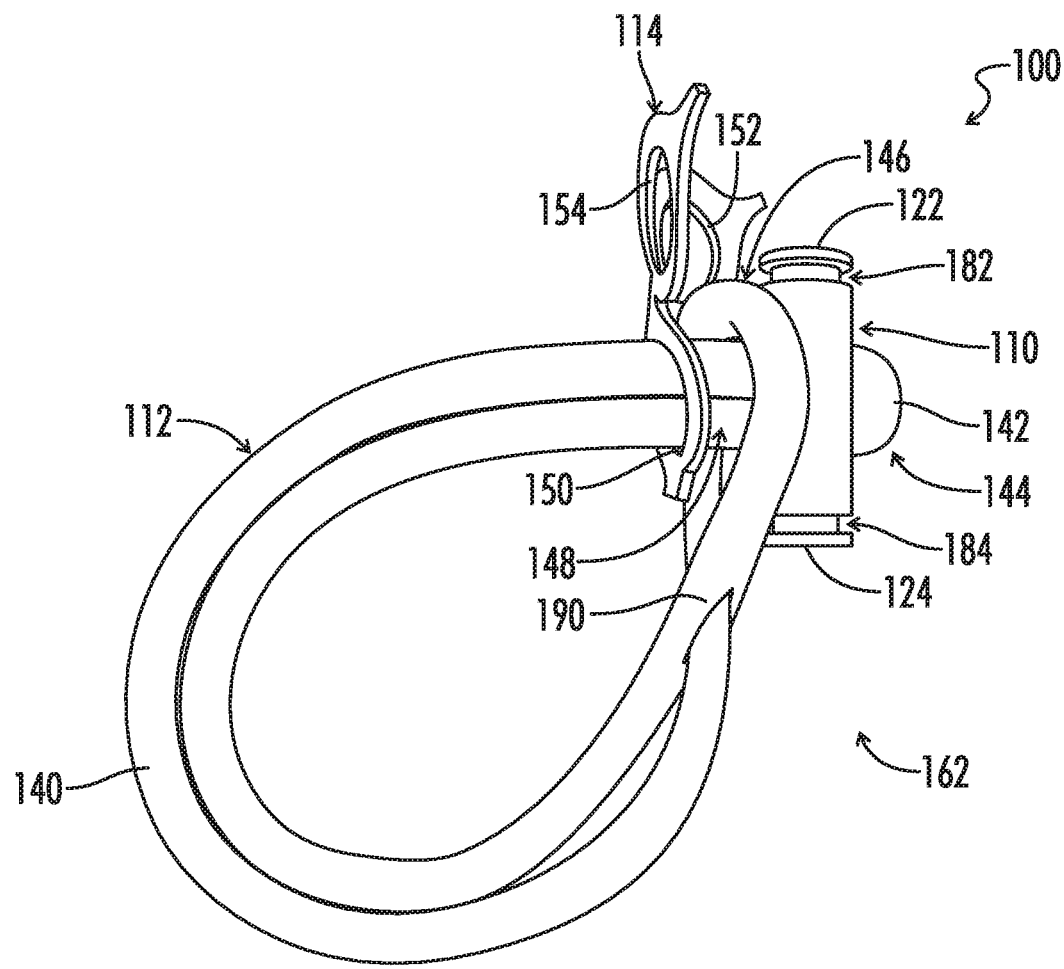
FIG. 2 is a perspective view of the lockable shackle apparatus of FIG. 1 in a closed configuration having a distal portion of the rope loop positioned over the stopper body.
Figure 3:
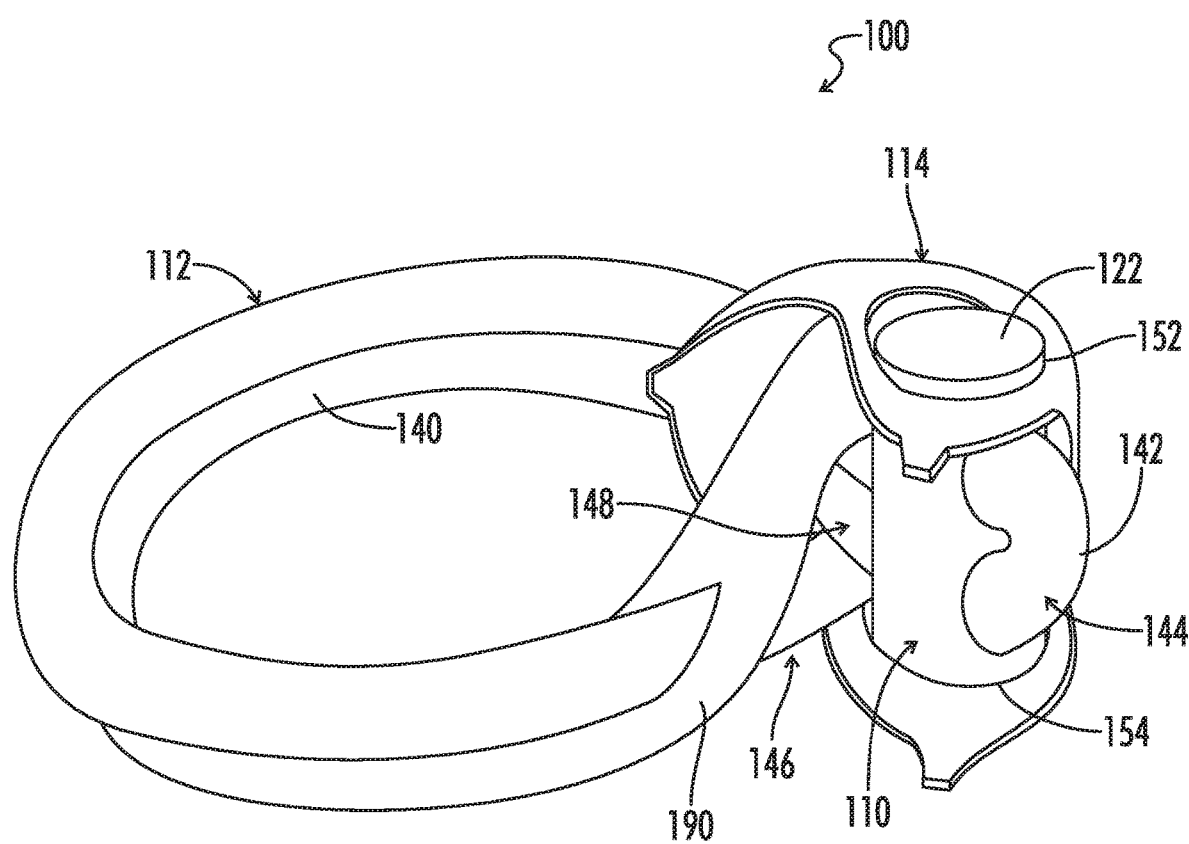
FIG. 3 is a perspective view of the lockable shackle apparatus of FIG. 1 in a locked configuration having the distal portion of the rope loop positioned over the stopper body and having first and second free ends of the flexible lock positioned over first and second ends of the stopper body.

The lockable shackle apparatus 100 may be configured in an open configuration 160 (shown in FIG. 1), a closed configuration 162 (shown in FIG. 2), or a locked configuration 164 (shown in FIG. 3). The open configuration 160 is associated with a distal portion 146 of the majority 140 of the rope 112 extending freely away from the stopper body 110. The distal portion 146 may also be referred to herein as an eyelet 146. When in the open configuration 160 the rope 112 may be threaded through at least one object (not shown) to be coupled to the lockable shackle apparatus 100 when in the closed or locked configurations 162, 164.

As can best be seen in FIG. 2, the closed configuration 162 is associated with the distal portion 146 of the majority 140 of the rope 112 being positioned over the first and second ends 122, 124 of the stopper body 110 between the flexible lock 114 and the stopper body 110. Accordingly, the distal portion 146 of the majority 140 of the rope 112 is looped around a proximal portion 148 of the majority 140 of the rope 112. The proximal portion 148 of the majority 140 of the rope 112 may be defined between the flexible lock 114 and the stopper body 110. The rope 112 in conjunction with the stopper body 110 thus forms a closed-loop when in the closed configuration 162. Alternatively, as can best be seen in FIG. 16, the closed configuration 162 may be associated with the distal portion 146 of the rope 112 being passed through the proximal portion 148 of the rope 112 (FIG. 15) before being positioned over the first and second ends 122, 124 of the stopper body 110.

As can best be seen in FIG. 3, the locked configuration 164 includes the closed configuration 162 and is associated with the first and second lock holes 152, 154 of the flexible lock 114 being positioned over the first and second ends 122, 124, respectively, of the stopper body 110 such that the distal portion 146 of the majority 140 of the rope 112 cannot be removed from the stopper body 110. The flexible lock 114 is thus configured to secure the distal portion 146 of the majority of the rope 112 over the stopper body 110 from an opposite side of the stopper body 110 than that from which the distal portion 146 of the rope 112 is extending from.

Figure 7:
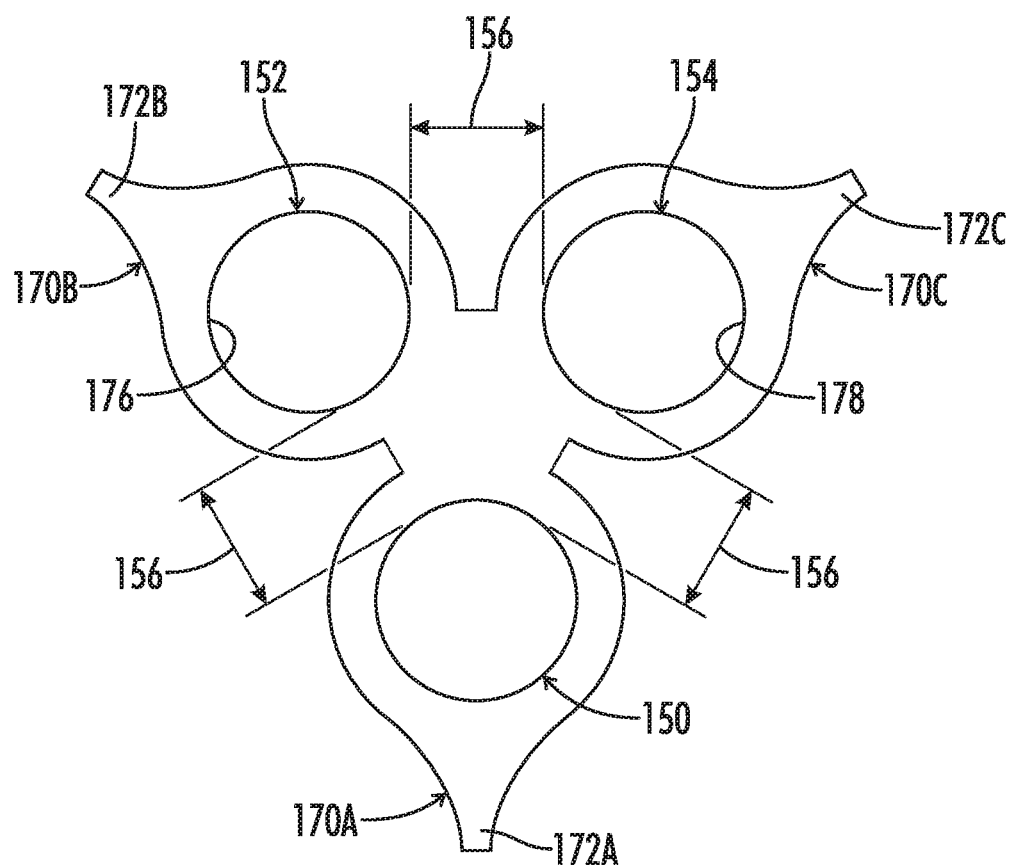
FIG. 7 is a top plan view of the flexible lock of FIG. 1.

As can best be seen in FIG. 7, each of the main hole 150, the first lock hole 152, and the second lock hole 154 of the flexible lock 114 may be separated by a common distance 156. Additionally, the main hole 150, the first lock hole 152, and the second lock hole 154 may be identical in diameter. In other embodiments (not shown), the first and second lock holes 152, 154 may be positioned closer to or further from the main lock hole 150 than they are relative to each other. Additionally, in accordance with this alternate embodiment (not shown) or the one shown, the main hole 150 may be sized differently (e.g., have a different diameter) than the first lock hole 152 and the second lock hole 154.

As can best be seen in FIG. 7, the flexible lock 114 may be generally triangular with three corners 170A, 170B, 170C. In other embodiments (not shown), the flexible lock 114 may be T-shaped or the like. Each of the main hole 150, the first lock hole 152, and the second lock hole 154 may be positioned proximate to a different one of the three corners 170A, 170B, 170C. Each of the three corners 170A, 170B, 170C may include a tab 172A, 172B, 172C integrally formed therewith and extending therefrom. Each of the three tabs 172A, 172B, 172C may extend away from the two holes not associated with its respective corner. Each of the three tabs 172A, 172B, 172C is configured to aid in positioning each of the main hole 150, the first lock hole 152, or the second lock hole 154 over the majority 140 of the rope 112, the first end 122 of the stopper body 110 or the second end 124 of the stopper body 110, respectively. Accordingly, the three tabs 172A, 172B, 172C allow for the user (not shown) to grip the flexible lock 114 for easy engagement and disengagement. The three tabs 172A, 172B, 172C may also be referred to herein as a plurality of tabs. The shape of the flexible lock 114 allows for less waste when producing a plurality of flexible locks from a sheet of rubber (not shown) or like material.

As can best be seen in FIGS. 1, 2, 4 and 5, the stopper body 110 may include a first groove 182 and second groove 184. The first groove 182 may be defined between the first passageway 126 and the first end 122 of the stopper body 110. The second groove 184 may be defined between the second passageway 128 and the second end 124 of the stopper body 110. The first groove 182 may be configured to receive a rim 176 (FIG. 7) of the first lock hole 152 of the flexible lock 114. The second groove 184 may be configured to receive a rim 178 (FIG. 7) of the second lock hole 154 of the flexible lock 114. As illustrated, the first and second grooves 182, 184 are defined circumferentially relative to the length 120 of the stopper body 110. The shape of the first and second grooves 182, 184 may be square or rectangular. As further illustrated, the stopper body 110 is cylindrically shaped between the first and second ends 122, 124. In other embodiments, however, the stopper body 110 may be shaped differently, such as for example, rectangularly, semi-circular or the like.

The first and second passageways 126, 128 may each include a respective axis which are parallel to each other. In other embodiments, not shown, the respective axes of the first and second passageways 126, 128 may merely be positioned in a common plane that bisects the stopper body 110.

As can best seen in FIG. 4, each end of the second pair of adjacent ends 132 of the first and second passageways 126, 128 may include a tapered portion 134. The tapered portion 134 may also be referred to as a chamfered portion 134. As illustrated, the tapered portion 134 may span only a portion of the circumference of each rim of the second pair of adjacent ends 132 of the first and second passageways 126, 128. The minority 142 of the rope 112 may pass over the tapered portion 134 of each end of the second pair of adjacent ends 132. The tapered portion 134 of each of the second pair of adjacent ends 132 provides a relief for the rope 112 so that the rope 112 is not pulled against sharp corners of the ends of the first and second passageways 126, 128. The tapered portion 132 may ensure and increase the longevity of the rope 112 because the rope 112 is not pulled against or cut by the sharp corners. Additionally, should the rope move within the first and second passageways 126, 128 (e.g., to normalize the tension of the two legs) while under a load, the tapered portion 132 may reduce the likelihood of the rope 112 fraying and potentially failing.

Figure 8A:
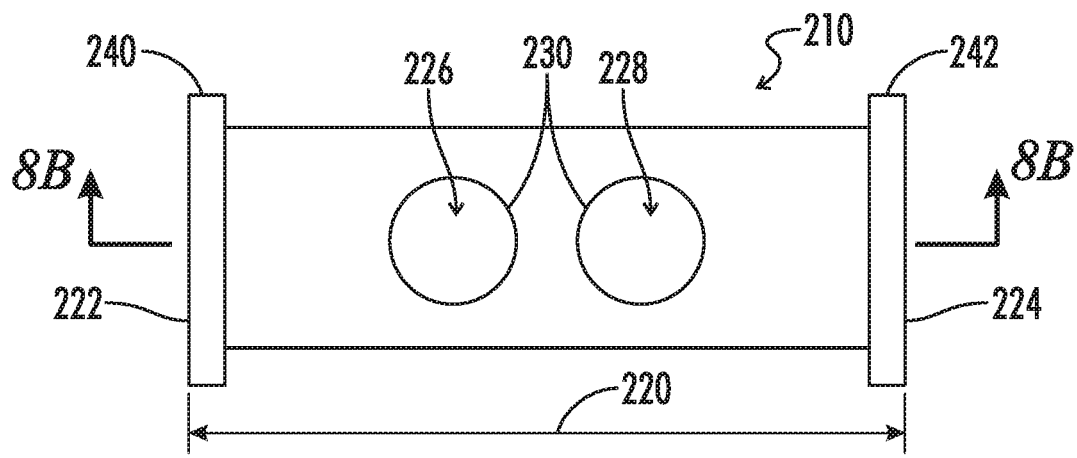
FIG. 8A is a top plan view of a first alternate embodiment of the stopper body of FIG. 1.
Figure 8B:
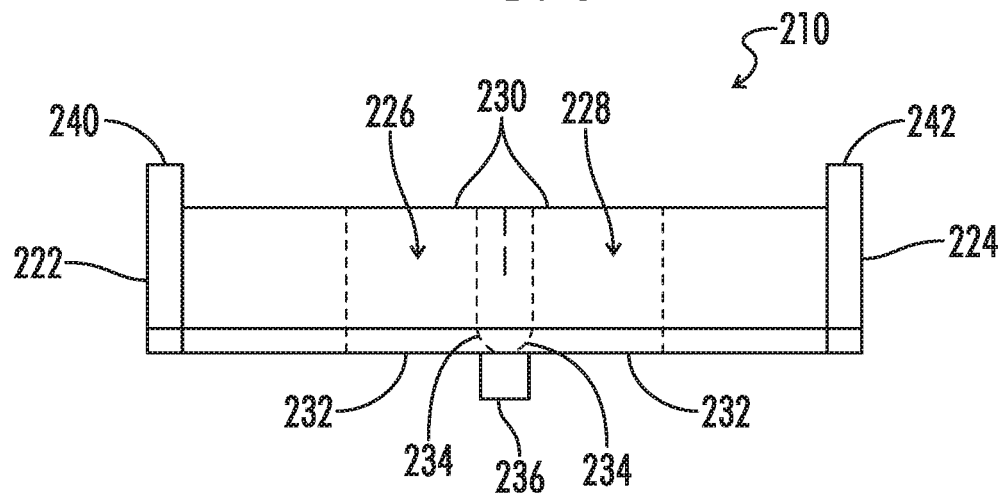
FIG. 8B is a front cross-sectional elevation view of the stopper body of FIG. 8A taken along line 8B-8B of FIG. 8A.
Figure 8C:
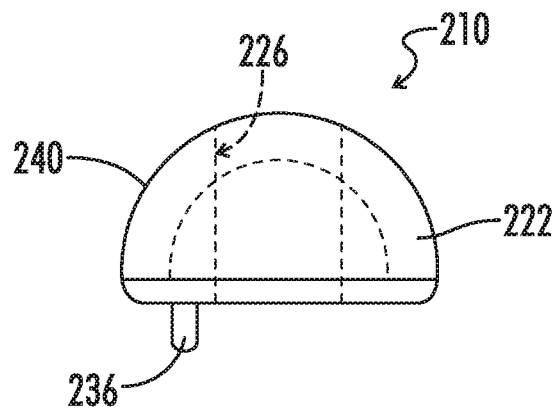
FIG. 8C is a left side elevation view of the stopper body of FIG. 8A.

As can best be seen in FIGS. 8A-8C, an embodiment of a stopper body 210 is shown. The stopper body 210 may be an alternate embodiment of the stopper body 110. The stopper body 210 includes a length 220 defined between a first end 222 and a second end 224. The stopper body 210 further includes a first passageway 226, second passageway 228, and first and second pairs of adjacent ends 230, 232 of the first and second passageways 226, 228. As can best be seen in FIG. 8B, each of the second pair of adjacent ends 232 may include a tapered portion 234. As can best be seen in FIGS. 8B and 8C, the stopper body 210 may further include a nub 236 extending away from the stopper body 210 in a direction opposite to which the majority 140 of the rope 112 (not shown) would extend. The nub 236 may be used for attachment of the flexible lock 114 (not shown) when configuring the lockable shackle apparatus 100 in the locked configuration 164 as an alternative to the first and second lock holes 152, 154, or in conjunction therewith. The stopper body 210 may be semi-cylindrically shaped between the first and second ends 222, 224. Finally, the stopper body 210, as opposed to having first and second grooves, may include first and second lips 240, 242 extending circumferentially from the stopper body 210. The first lip 240 may be positioned between the first end 222 and the first passageway 226. The second lip 242 may be positioned between the second end 224 and the second passageway 228. The first and second lips 240, 242 may aid in retaining the first and second lock holes 152, 154 (when/if utilized) of the flexible lock 114 onto the first and second ends 222, 224 of the stopper body 220.

Figure 9:
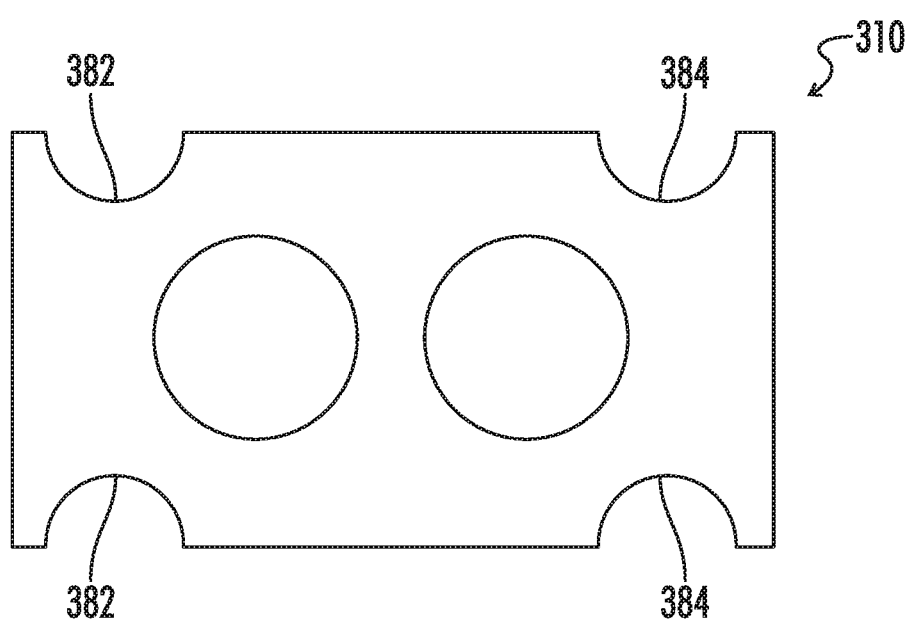
FIG. 9 is a top plan view of a second alternate embodiment of the stopper body of FIG. 1.

As can best be seen in FIG. 9, another embodiment of a stopper body 310 is illustrated. The stopper body 310 may be an alternate embodiment of the stopper body 110. Particularly, the stopper body 310 may include first and second grooves 382, 384 which are shaped differently than the first and second grooves 182, 184 of the stopper body 110. The first and second grooves 382, 384 of the stopper body 310 may be semi-circular rather than square or rectangular.

Figure 10A:
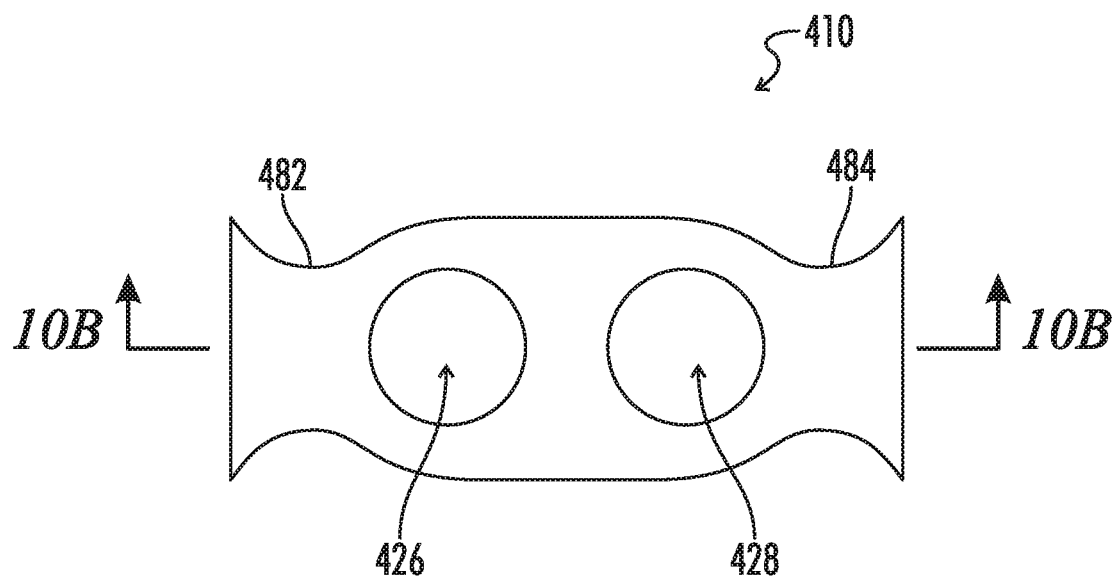
FIG. 10A is a top plan view of a third alternate embodiment of the stopper body of FIG. 1.
Figure 10B:
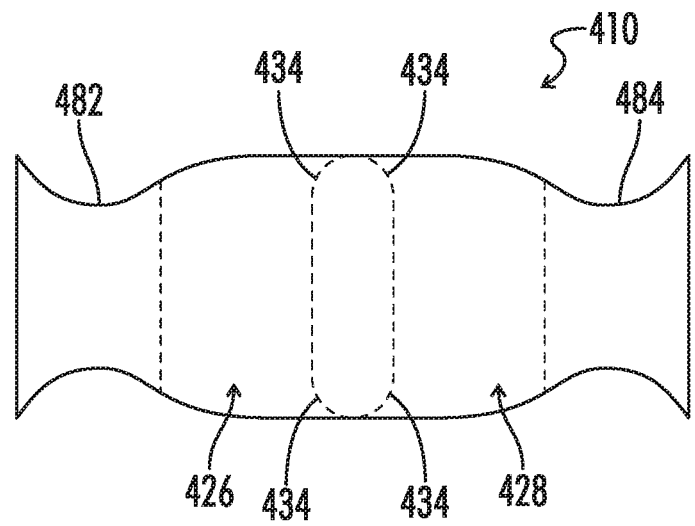
FIG. 10B is a front cross-sectional elevation view of the stopper body of FIG. 10A taken along like 10B-10B of FIG. 10A.

As can best be seen in FIGS. 10A-10B, another embodiment of a stopper body 410 is illustrated. The stopper body 410 may be an alternate embodiment of the stopper body 110. Particularly, the stopper body 410 may include first and second grooves 482, 484 which are shaped differently than the first and second grooves 182, 184 of the stopper body 110. The first and second grooves 482, 484 of the stopper body 410 may be semi-circularly shaped with tapered edges rather than square or rectangular like those of the stopper body 110 or semi-circular like those of the stopper body 310. The semi-circular tapered shape of the first and second grooves 482,484 eliminates the shape corners of the grooves of the stopper bodies 110, 310 which may cause damage to the first and second lock holes 152, 154 of the flexible lock (not shown) and potential failure thereof. First and second passageways 426, 428 of the stopper body 410 may include tapered portions 434 at both ends thereof.

Figure 11:
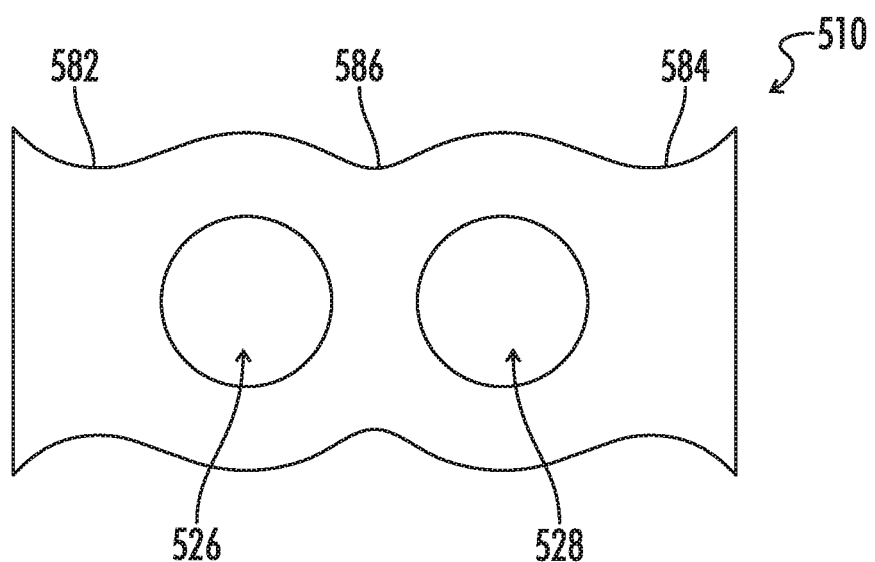
FIG. 11 is a top plan view of a fourth alternate embodiment of the stopper body of FIG. 1.

As can best be seen in FIG. 11, another embodiment of a stopper body 510 is illustrated. The stopper body 510 may be an alternate embodiment of the stopper body 110. The stopper body 510 may be similar to the stopper body 410 with first and second grooves 582, 584 that semi-circularly shaped with tapered edges. The stopper body 510 may further include a middle groove 586 defined circumferentially around the stopper body 510 between first and second passageways 526, 528 of the stopper body 510. The middle groove 586 may help reduce the weight of the stopper body 510 and increase its strength by increasing the exterior surface area.

Figure 12:
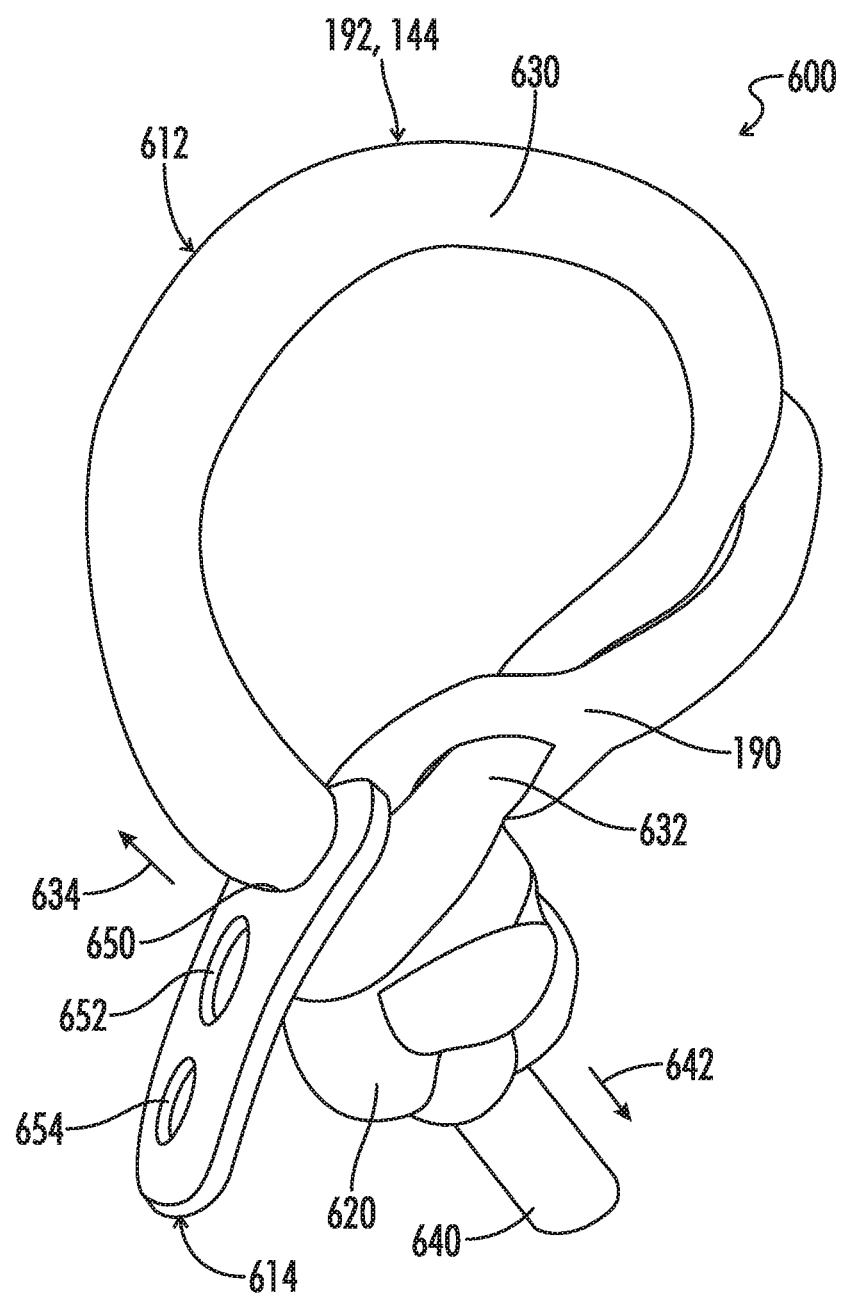
FIG. 12 is a perspective view of an alternate embodiment of a lockable shackle apparatus having a second embodiment of rope loop extending from a knot in a first direction, a post extending from the knot in a second direction, and an embodiment of a flexible lock positioned on the rope loop proximate to the knot in accordance with the present disclosure.
Figure 13:
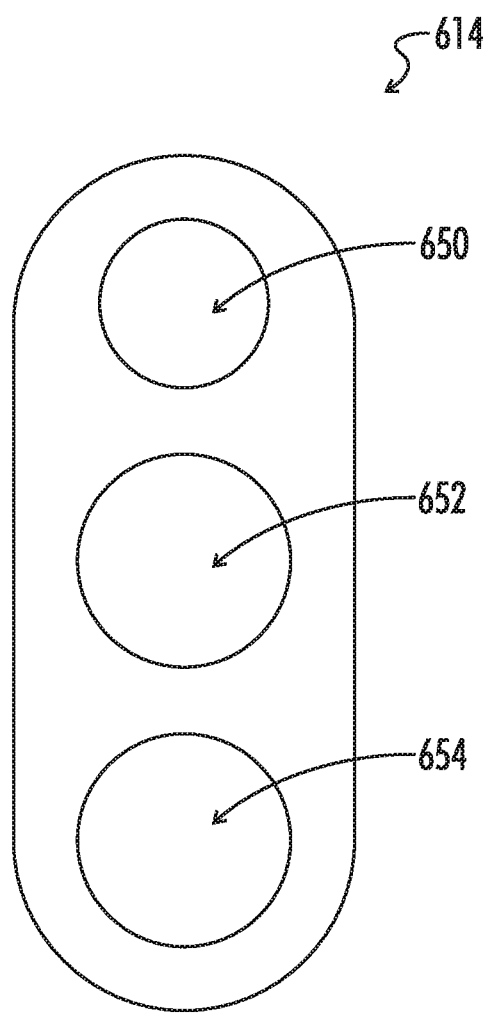
FIG. 13 is a top plan view of the flexible lock of FIG. 12.

As can best be seen in FIG. 12, an alternate embodiment of a lockable shackle apparatus 600 is illustrated. The lockable shackle apparatus 600 comprises a rope 612 and a flexible lock 614. The rope 112 may include a knot 620 with a majority 630 of the rope 612 forming a loop 632 extending in a first direction 634 and a nub 640 of the rope 612 extending in a second direction 642 opposite the first direction 634. The nub 640 may be hardened with a covering or coating so as to not be flexible. As can best be seen in FIGS. 12 and 13, the flexible lock 614 may include a main hole 650, a first lock hole 652, and a second lock hole 654, all aligned sequentially. The main hole 650 may be configured to receive the majority 630 of the rope 612 therethrough and may be positioned adjacent to the knot 620. Once a distal portion of the loop 632 has been positioned over the knot 620 between the knot 620 and the flexible lock 614, one of the first or second lock holes 652, 654 may be positioned over the nub 640 in order to lock the distal portion of the loop 632 and the knot 620 together. The size of the main hole 650, the first lock hole 652, and the second lock hole 654 may be identical or different.

Because both flexible locks 114, 614 are made from rubber, they are designed not to rotate during use. This is due to the friction between the rim of the main hole 150 and the rope 112. This anti-rotational characteristic of the flexible lock 614 prevents the loop end (e.g., distal portion 146) from slipping on the knot 620. It may also prevent the user (not shown) from installing the flexible lock 114 in the locked configuration 164 incorrectly.

Figure 14A:
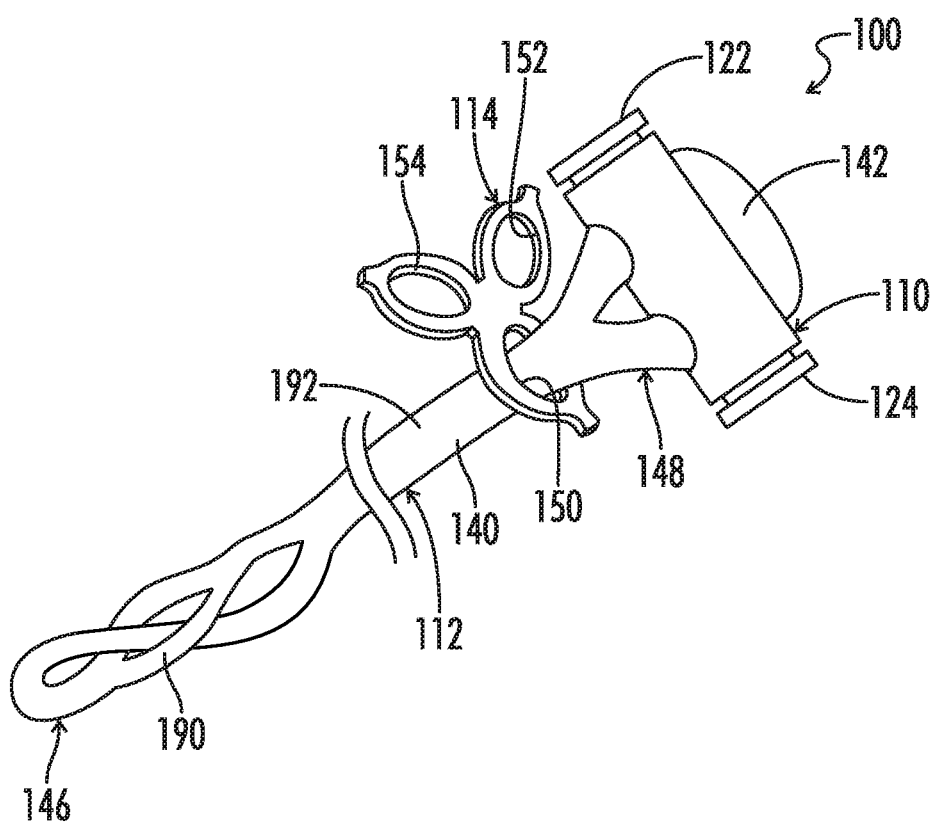
FIG. 14A is a perspective view of the lockable shackle apparatus of FIG. 1 with the second embodiment of the rope loop extending from the stopper body.
Figure 14B:
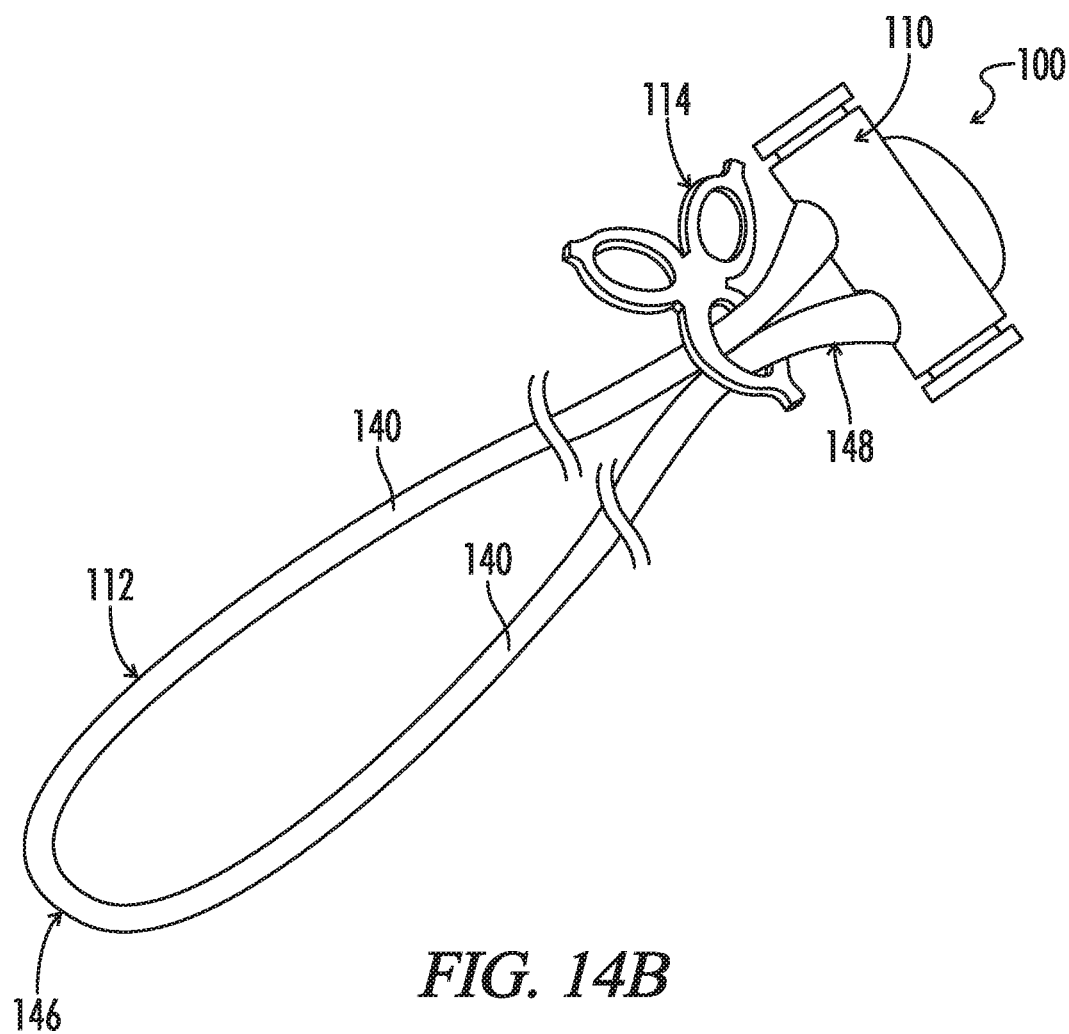
FIG. 14B is a perspective view of the lockable shackle apparatus of FIG. 1 with a third embodiment of the rope loop extending from the stopper body.
Figure 14C:
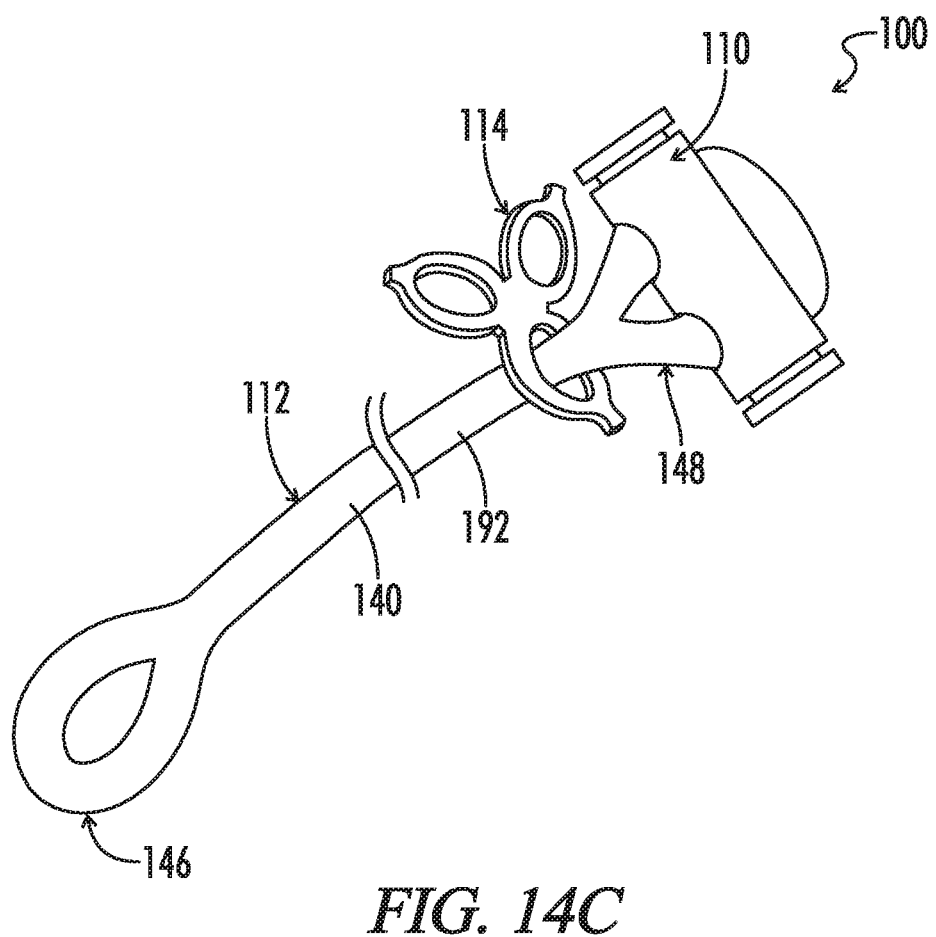
FIG. 14C is a perspective view of the lockable shackle apparatus of FIG. 1 with a fourth embodiment of the rope loop extending from the stopper body.

As can best be seen in FIGS. 14A-14C, different embodiments of the rope 112 are shown in conjunction with the stopper body 110 and the flexible lock 114 in the open configuration 160. As shown in FIGS. 1-3, the rope 112 comprises two distinct strands defined between the distal and proximal portions 146, 148 of the majority 140 of the rope 112. In accordance with this embodiment, the distal end 146 of the rope 112 includes a self-tightening loop 190, wherein the rope 112 spits apart and passes back through itself so as to tighten the self-tightening loop 190 when a tension is applied. As shown in FIGS. 12 and 14A, the rope 112 comprises a single stand 192 defined between the distal and proximal portions 146, 148 of the majority 140 of the rope 112. In accordance with this embodiment, the spliced portion 144 may be positioned within or may be part of the single strand 192. Additionally, the distal portion 146 may include the self-tightening loop 190. As shown in FIG. 14B, the rope 112 comprises two distinct strands defined between the distal and proximal portions 146, 148 of the majority 140 of the rope 112, like the rope 112 shown in FIGS. 1-3. The rope 112 in FIG. 14B, however, does not include the self-tightening loop 190 located at the distal portion 146, like the rope 112 shown in FIGS. 1-3. As shown in FIG. 14C, the rope comprises the single stand 192 defined between the distal and proximal portions 146, 148 of the majority 140 of the rope 112, like the rope 112 of FIG. 14A. The rope 112 in FIG. 14C, however, does not include the self-tightening loop 190 located at the distal portion 146, like the rope 112 shown in FIG. 14A.

Figure 14D:
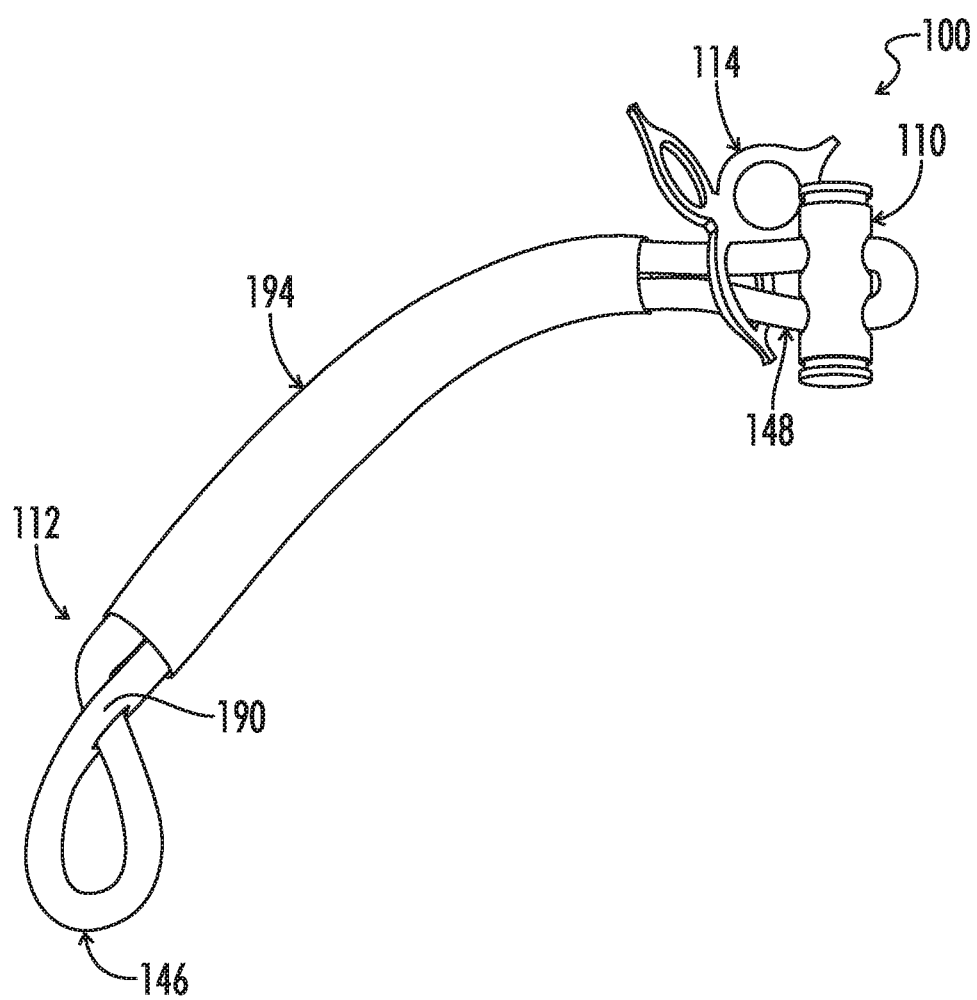
FIG. 14D is a perspective view of the lockable shackle apparatus of FIG. 1 with a protective sleeve positioned over at least a portion of the rope loop in accordance with the present disclosure.

As can best be seen in FIG. 14D, the lockable shackle apparatus 100 may include a protective sleeve 194 configured to receive the majority 140 of the rope 112 between the distal and proximal portions 146, 148 of the rope 112. The flexible lock 114 may be positioned on the majority 140 of the rope between the protective sleeve 194 and the stopper body 110. The protective sleeve helps increase the friction of the lockable shackle apparatus 100 when towing and also helps protect the rope 112 from abrasion and cuts, thus potentially extending the useful life of the rope 112 of the lockable shackle apparatus 100. The protective sleeve 194 may be an expandable webbing that is configured to breath for allowing moisture to escape. Additionally, the protective sleeve 194 as an expandable webbing will make it easy slide the sleeve over the rope 112 for visual safety inspection of the rope. The protective sleeve 194 may be made from any suitable material such as polyester, nylon, polyethylene terephthalate (PET), Kevlar, or some other flexible, abrasive resistant material that may or may not be woven into an expandable webbing.

Figure 16:
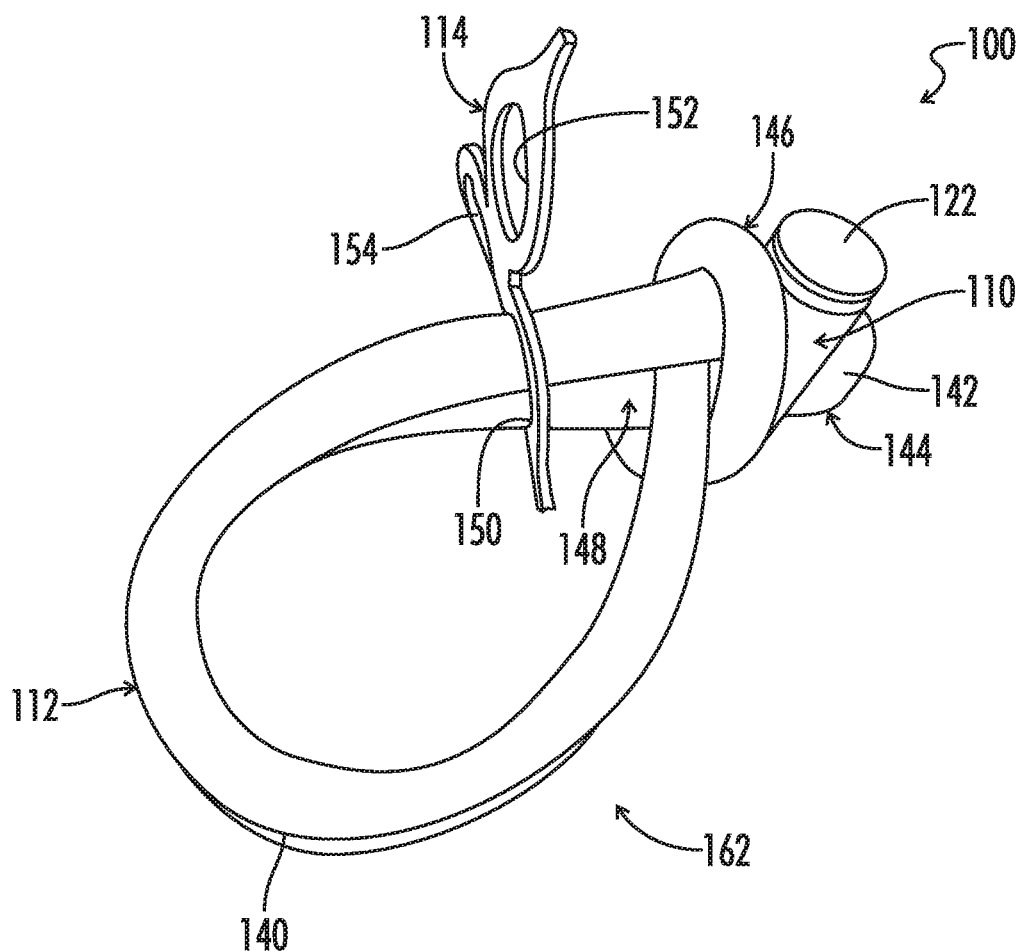
FIG. 16 is a perspective view of the lockable shackle apparatus of FIG. 15 in the closed configuration in accordance with the present disclosure.
Figure 17:
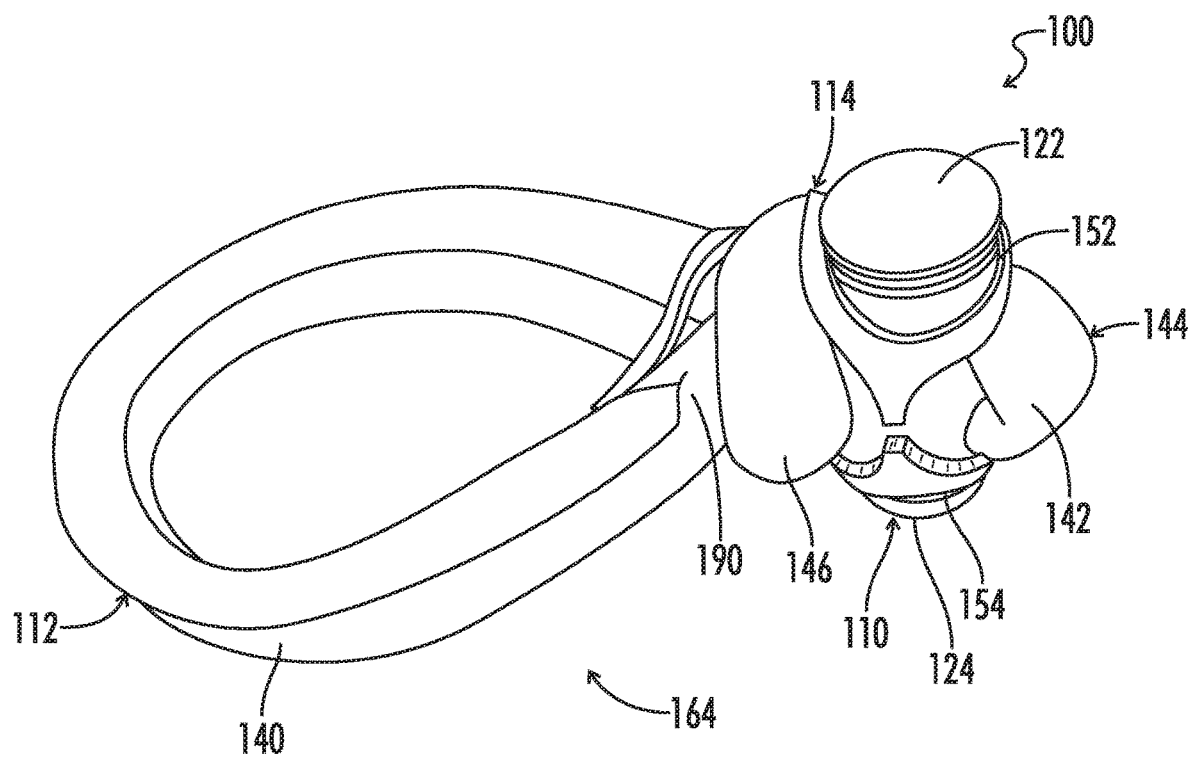
FIG. 17 is a perspective view of the lockable shackle apparatus of FIG. 15 in the locked configuration in accordance with the present disclosure.

As can best be seen in FIGS. 4 and 5, the first and second pairs of adjacent ends 130, 132 of the first and second passageways 126, 128 are positioned as close as possible in order to allow for the maximization of the strength of the stopper body 110 while making the stopper body 110 as small as possible (e.g., minimizing its length 120) to define a spacing 198 between the first and second pairs of adjacent ends 130, 132 of the first and second passageways 126, 128. A spacing 198 of approximately the width of the rope used with the stopper body 110 is preferable. The spacing 198 may be varied depending on the size of the shackle. In other embodiments of the stopper body 110, the spacing 198 may be increased in order to allow for the distal portion 146 of the majority 140 of the rope 112 to pass more easily between the two legs of the proximal portion 148 of the rope 112 between the flexible lock 114 and the stopper body 120, prior to the distal portion 146 being looped over the stopper body 110 (shown in FIGS. 15-17). In such an embodiment, the spacing 198 may be approximately two times the width of the rope used with the stopper body 110.

In certain embodiments (not shown), the flexible lock 614 may be used as an alternative to the flexible lock 114, such as, for example, in conjunction with the stopper body 210 shown in FIGS. 8A-8C.

In other embodiments (not shown), the stopper body 110 may be designed to allow for the rope 112 (e.g., that has already been spliced together for form a continuous loop) to be removed and replaced. For example, the first and second ends 122, 124 of the stopper body 110 may be removable to thus allow access to sides of the first and second passageways 126, 128. This may allow for multiple lengths of rope 112 to be sold with the stopper body 110.

In still further embodiments (not shown), a rim of the main hole 150 of the flexible lock 114 may include a rigid or metal insert. Alternatively, a metal ring (not shown) may be positioned over the majority 140 of the rope 112 between the flexible lock 114 and the stopper body 110. A rigid insert or a metal ring may help prolong the useful life of the flexible lock 114 because it will prevent the main hole from stretching and rubbing against the rope 112 as much when engaging and disengaging the flexible lock 114 from the stopper body 110. This may be especially useful with regard to the embodiment shown in FIGS. 15-17 where the distal portion 146 of the rope 112 passes back through the proximal portion 148 prior to being positioned over the stopper body 110 because this adds tension to the main hole 150 of the flexible lock 114. The tension on the main hole 150 of the flexible lock 114 can be mitigated by incorporating a rigid insert into the rim of the main hole 150 of the flexible lock 114 or including a separate metal ring positioned between the flexible lock 114 and the stopper body 110.

As can best be seen in FIGS. 1-3 and 15-17, a method of using the lockable shackle apparatus 100 is also provided herein. As can best be seen in FIG. 1, the method includes (Step A) providing a stopper body 110 with a rope 112 extending therefrom and a flexible lock 114 received on the rope 112 such that the flexible lock 114 is positioned proximate to the stopper body 110 with a majority of the rope 140 of the rope 110 extending through the flexible lock 114 away from the stopper body 110. As can best be seen in FIG. 2, the method may further include (Step B) looping a distal portion 146 of the rope 112 over the stopper body 110 on a proximal portion 148 of the rope 112 between the flexible lock 114 and the stopper body 110. As can best be seen in FIG. 3, the method may further include (Step C) positioning first and second free ends 152, 154 of the flexible lock 114 over respective first and second ends 122, 124 of the stopper body 110 to lock the distal portion 146 of the rope 112 around the stopper body 110.

Step C of the method may further comprise positioning a first locking hole 152 of the flexible lock 114 over the first end 122 of the stopper body 110 and positioning the second locking hole 154 of the flexible lock 114 over the second end 124 of the stopper body 110. In order to accomplish this, the flexible lock 114 (e.g., the first locking hole 152 and the second locking hole 154) may need to be stretched in order to be positioned over the first and second ends 122, 124 of the stopper body 110. The tension created by stretching the flexible lock 114 acts to keep the flexible lock 114 in place when the lockable shackle apparatus 110 is to be configured in the locked configuration 164.

The method may further comprise, prior to Step B, positioning the rope 112 through first and second objects (not shown) to be coupled together using the lockable shackle apparatus 100.

Figure 15:
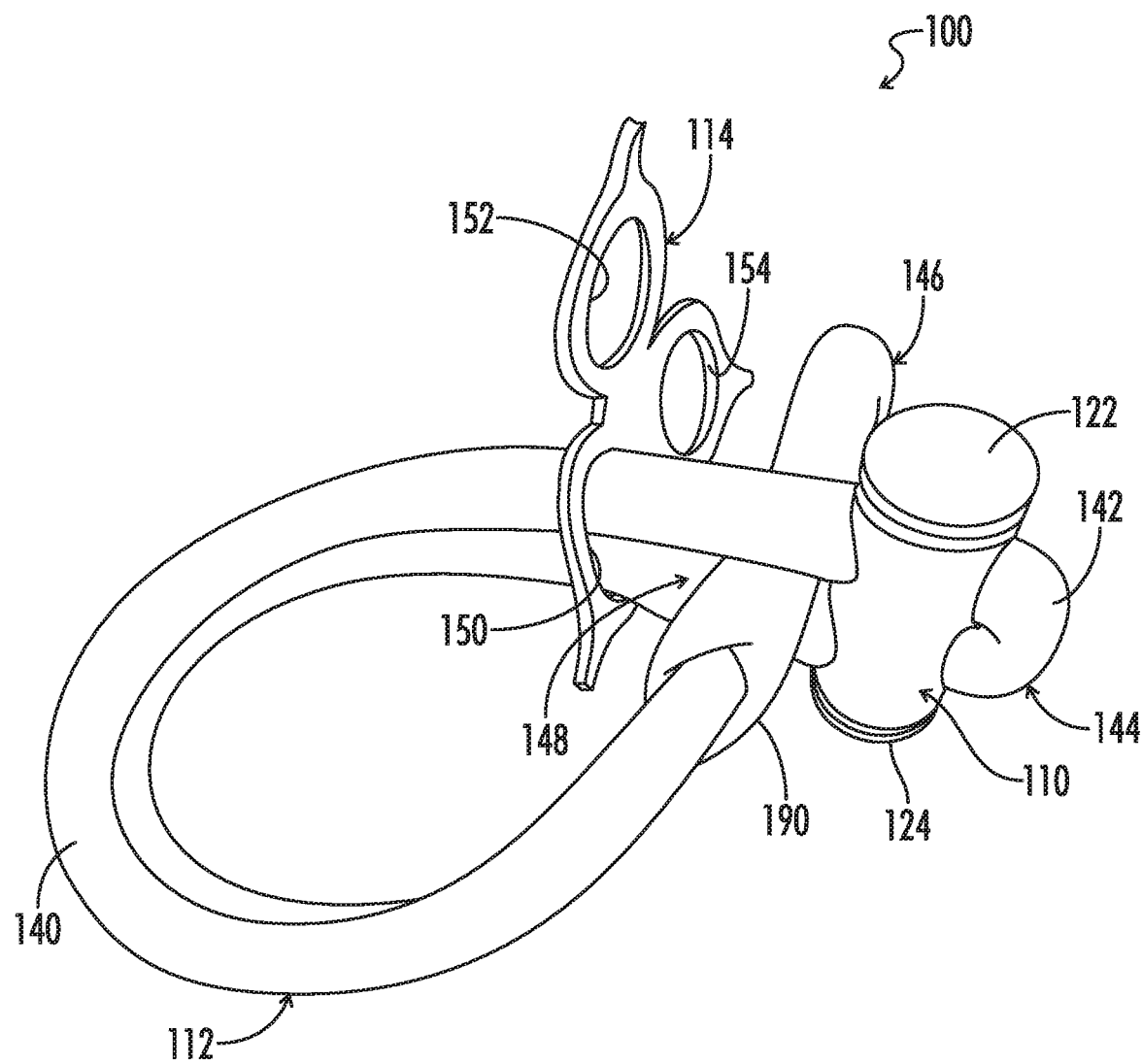
FIG. 15 is a perspective view of the lockable shackle apparatus of FIG. 1 with a distal portion of the rope loop positioned through a proximal portion in accordance with the present disclosure.

As can best be seen in FIG. 15, the method may further comprise, prior to Step B, positioning the distal portion 146 of the majority 140 of the rope 112 through the proximal portion 148 of the rope 112. In accordance with this additional method step, Step B may best be shown in FIG. 16 and Step C may best be shown in FIG. 17.

The method may further comprise (Step D) removing the first and second free ends of the flexible lock 114 from the first and second ends 122, 124 of the stopper body 110, and (Step E) removing the distal portion 146 of the rope 112 from the stopper body 110.

Step A of the method may further comprise positioning the rope 112 through any one of the three holes 150, 152, 154 of the flexible lock 114, when the three holes are identical. If the three holes 150, 152, 154 are not identical, Step A of the method comprises positioning the rope 112 through the main hole 150 of the flexible lock 114.

The method may further include various other method steps which may be inherent from or described by the description of the lockable shackle apparatus 100 above.

To facilitate the understanding of the embodiments described herein, a number of terms have been defined above. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful Lockable Shackle Apparatus and Method of Use, it is not intended that such references be construed as limitations upon the scope of this disclosure except as set forth in the following claims

What is claimed is:

1. A lockable shackle apparatus comprising:
a stopper body including a length defined between a first end and a second end, a first passageway extending through the stopper body transverse to the length, and a second passageway extending through the stopper body transverse to the length, the first passageway positioned closer to the first end than to the second end, the second passageway positioned closer to the second end than to the first end;
a rope positioned through the first and second passageways such that a majority of the rope extends between a first pair of adjacent ends of the first and second passageways; and
a flexible lock including a main hole, a first lock hole, and a second lock hole, wherein the main hole is configured to receive the majority of the rope therethrough and to be positioned adjacent to the stopper body, further wherein the first lock hole is configured to be positioned over the first end of the stopper body and the second lock hole is configured to be positioned over the second end of the stopper body.

2. The lockable shackle apparatus of claim 1, wherein:
a distal portion of the majority of the rope opposite the stopper body is configured to be positioned over the first and second ends of the stopper body between the flexible lock and the stopper body.

3. The lockable shackle apparatus of claim 1, wherein:
the first and second passageways include a second pair of adjacent ends; and
a minority of the rope passes closely between the second pair of adjacent ends.

4. The lockable shackle apparatus of claim 3, wherein:
each end of the second pair of adjacent ends of the first and second passageways includes at least a tapered portion; and
the minority of the rope passes over the tapered portion of each end of the second pair of adjacent ends.

5. The lockable shackle apparatus of claim 1, wherein:
the first and second passageways are parallel.

6. The lockable shackle apparatus of claim 1, wherein:
the stopper body includes a first groove defined between the first passageway and the first end, and a second groove defined between the second passageway and the second end;
the first groove is configured to receive a rim of the first lock hole of the flexible lock; and
the second groove is configured to receive a rim of the second lock hole of the flexible lock.

7. The lockable shackle apparatus of claim 6, wherein:
the first and second grooves are defined circumferentially relative to the length of the stopper body.

8. The lockable shackle apparatus of claim 1, wherein:
the stopper body is cylindrical between the first and second ends.

9. The lockable shackle apparatus of claim 1, wherein:
the rope is a continuous loop.

10. The lockable shackle apparatus of claim 9, wherein:
the rope includes a spliced portion configured to define the continuous loop; and
the spliced portion is configured to be positioned within the first and second passageways of the stopper body.

11. The lockable shackle apparatus of claim 1, wherein:
each of the main hole, the first lock hole, and the second lock hole are separated by a common distance.

12. The lockable shackle apparatus of claim 1, wherein:
the flexible lock is generally triangular having three corners with one of the main hole, the first lock hole, or the second lock hole positioned proximate to each corner.

13. The lockable shackle apparatus of claim 12, wherein:
the flexible lock includes a plurality of tabs, each tab associated with one of the main hole, the first lock hole, or the second lock hole and being configured to extend away from a remaining two of the main hole, the first lock hole, or the second lock hole; and
each tab is configured to aid in positioning each of the main hole, the first lock hole, or the second lock hole over the majority of the rope, the first end of the stopper body, or the second end of the stopper body, respectively.

14. A lockable shackle apparatus comprising:
a cylindrical stopper body including a first end, a second end, a first passageway defined through the stopper body, and a second passageway defined through the stopper body, each of the first and second passageways having a respective axis laying in a common plane bisecting the cylindrical stopper body, the first passageway positioned closer to the first end than to the second end, the second passageway positioned closer to the second end than to the first end;
a rope positioned through the first and second passageways such that a majority of the rope extends from a first pair of adjacent ends of the first and second passageways; and
a flexible lock including a first lock hole, a second lock hole, and a third lock hole, wherein one of the first, second, or third lock holes is configured to received the majority of the rope therethrough and be positioned adjacent to the stopper body, further wherein a different one of the first, second, or third lock holes is configured to be positioned over the first end of the stopper body and a remaining one of the first, second, or third lock holes is configured to be positioned over the second end of the stopper body.

15. The lockable shackle apparatus of claim 14, wherein:
the cylindrical stopper body includes a first groove positioned between the first end and the first passageway and a second groove positioned between the second end and the second passageway;
at least a portion of a rim of one of the first, second, or third lock holes is configured to be received by the first groove; and
at least a portion of a rim of a different one of the first, second, or third lock holes is configured to be received by the second groove.

16. A method of using a lockable shackle apparatus comprising:
(a) providing a stopper block with a rope loop extending therefrom and a locking mechanism received on the rope loop such that the locking mechanism is positioned proximate to the stopper block with a majority of the rope loop extending through the locking mechanism away from the stopper block;
(b) looping a distal portion of the rope loop over the stopper block between the stopper block and the locking mechanism; and
(c) positioning first and second free ends of the locking mechanism over respective first and second ends of the stopper block to lock the distal portion of the rope loop around the stopper block.

17. The method of claim 16, wherein step (c) further comprises:
positioning a first locking hole of the locking mechanism over the first end of the stopper block; and
positioning a second locking hole of the locking mechanism over the second end of the stopper block.

18. The method of claim 16, further comprising prior to step (b):
positioning the distal portion of the rope loop through a proximal portion of the rope loop defined between the locking mechanism and the stopper block.

19. The method of claim 16, further comprising:
(d) removing the first and second free ends of the locking mechanism from the first and second ends of the stopper block; and
(e) removing the distal portion of the rope loop from the stopper block.

20. The method of claim 16, wherein step (a) further comprises:
positioning the rope loop through any one of three holes of the locking mechanism.

\* \* \* \* \*